July 9, 1929.  S. SIEGEL  1,720,531
DISPLAY DEVICE
Filed July 3, 1924
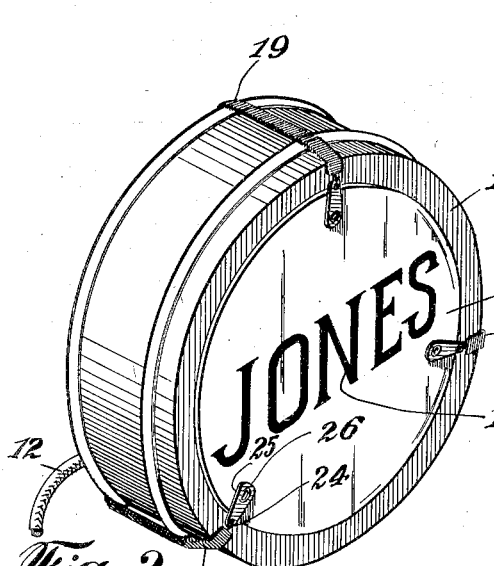
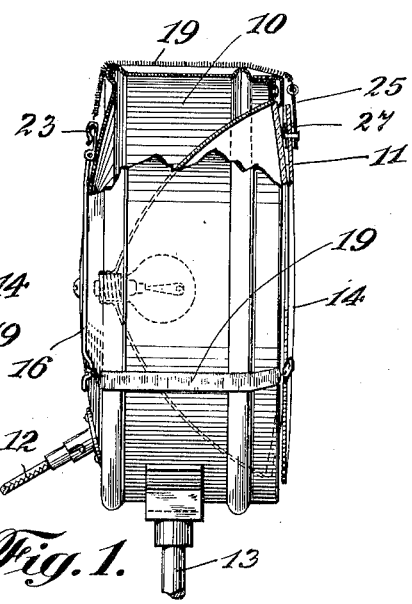
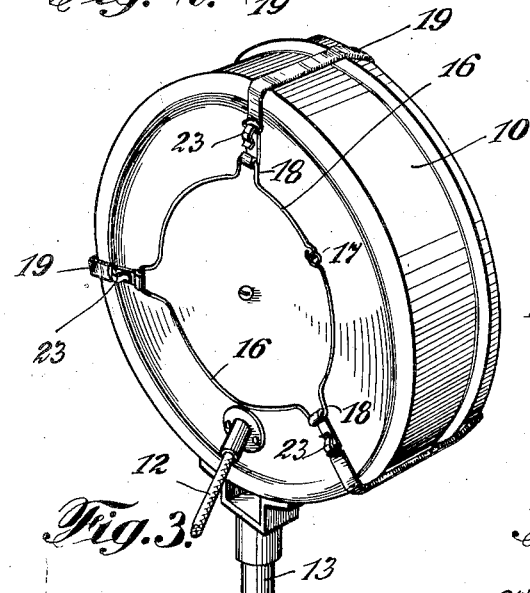
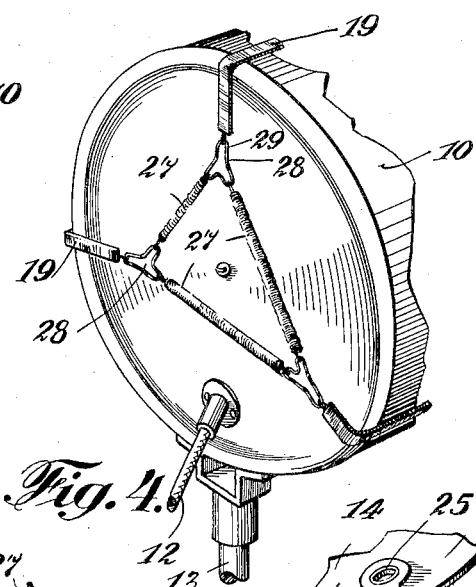
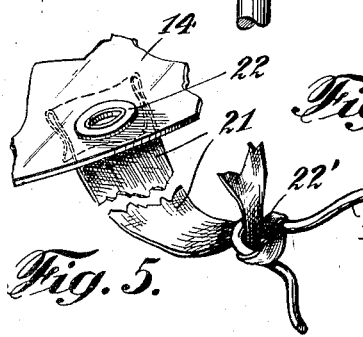
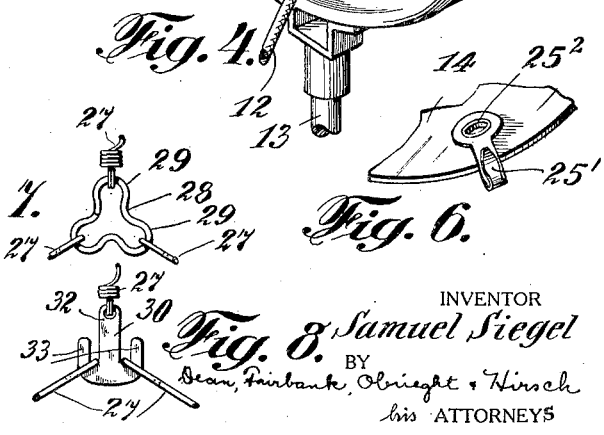
INVENTOR
Samuel Siegel
BY Dean, Fairbank, Obright & Hirsch
his ATTORNEYS Patented July 9, 1929.

1,720,531

UNITED STATES PATENT OFFICE.

SAMUEL SIEGEL, OF NEW YORK, N. Y.

DISPLAY DEVICE.

Application filed July 3, 1924. Serial No. 724,018.

This invention relates primarily to display devices more especially for advertising purposes and has particular application to an article for attachment to an automobile headlight so that the latter will afford the illumination necessary for proper display.

The invention although of more general application has a special field of application for political campaign purposes, to effect illuminated display of the name of a candidate for instance. on automobile headlights.

It is among the objects of the invention to provide a display device of the character set forth, which shall be inexpensive and rugged in construction, easily applicable to the headlight by a simple manipulation, requiring neither tools nor skill and without the need for mutilating or even dis-assembling the headlight or removing the lens or lead-in wire connection thereof in the process of application, without the need for separate small fastening parts likely to be lost; a single size of which device shall be universally applicable to headlights generally, regardless of style or dimensions thereof, and which device though so securely attached in place as not to come loose in ordinary use can yet be easily removed when desired.

A preferred embodiment of the invention includes a sheet adapted for disposition across the lens or window of a headlight casing, anchoring means arranged on the rear of the headlight and connecting devices passing over the peripheral edges of the headlight casing and connected with the anchoring means. The application of a single model of display device to all commercial styles of headlight, is permitted by distension of the flexible connecting devices, which accommodates the depth of the headlight that varies but a few inches in different styles.

In the accompanying drawings:

Fig. 1 is a view in side elevation of a headlight with my improved display device attached, Fig. 2 is a front perspective view of a headlight with the device attached, Fig. 3 is a similar view in rear perspective, Fig. 4 is a fragmentary rear perspective view illustrating a modified form of anchoring means, Fig. 5 is a fragmentary detail view illustrating a modified form of connecting device, Fig. 6 is a fragmentary view of a modification, Fig. 7 is an enlarged plan view of one of the connecting links of Fig. 4, and;

Fig. 8 is a similar view illustrating a modified type of link.

For illustrative purposes, I have shown the device only as applied to a conventional type of headlight which normally includes a casing 10, lens 11, lead wires 12 to a source of light (not shown) housed within the casing and a supporting arm or bracket 13 for mounting the casing in an appropriate position upon a vehicle. The sheet 14 is preferably of flexible material, transparent or translucent, such as celluloid, so that light passed therethrough will serve to throw into strong relief the contrasting translucent or opaque indicia 15 painted or otherwise affixed to the sheet. In the preferred application the sheet is of generally circular shape and sufficiently large to substantially cover the lens or window in the headlight casing.

In addition to the sheet, the structure includes an anchoring means adapted for disposition at the rear of the headlight casing and a plurality of flexible connecting devices adjustable as to their effective length, which are passed over the peripheral edges of the headlight casing and connect the sheet with the anchoring means. The anchoring means may be in the nature of a split ring 16, of spring wire, the extremities of the ring being hooked or otherwise shaped as indicated at 17 to facilitate their ready detachable connection and their spreading apart or separation for the purpose of passing over and encircling the lead wires for the lamp. The ring may be formed with a number of radially disposed outwardly extending U bends 18 serving as convenient points of attachment for the ends of the flexible connecting devices. For all ordinary purposes three of the connecting devices are found adequate for firmly holding the sheet over the face of the headlight. The connecting devices may be extensible coiled springs 19 as shown in Figure 2. The resilient connecting devices are preferably formed as spring hooks 23 one end of which is adapted to engage in one of the offset bends in the anchoring ring and the other end of which may be hooked into an aperture 24 in the free end of a radially disposed arm 25 fixed to the edge of the sheet. Each of these arms preferably comprises a relatively short length of light thin metal having its inner end riveted at 26 to the sheet adjacent the edge thereof. In riveting the arms to the sheet I prefer to employ gaskets or similar spacer members 22 of leather or the like which will permit the riveting or eyeleting operation to be carried on without danger of splitting or tearing the sheet and which will also strengthen the sheet against subsequent tearing when the connecting devices are placed under tension.

In Fig. 6 is shown a desirable modification in which in lieu of the arm 25 shown in Fig. 1, there is provided a hook structure 25', the inner end of which provides an eye $25^2$ riveted to the plate 14. In this construction, the connection and disconnection of the fasteners is, of course, made at the hook or plate rather than at the anchoring device 16.

The device is sold or distributed to the user preferably with parts interconnected, each connecting spring clasped at one end to the sheet and at the other to the anchor ring. To apply the device to a headlight one of the extensible connecting devices 19 would be detached preferably from the plate 14. The sheet is then placed against the lens and the anchoring means positioned on the rear of the casing. This latter operation may involve disconnection of the ends 17 of the split ring to pass around the lead wires and will ordinarily result in slightly tensioning the two connected flexible devices. After reconnecting the ends of the split ring, the disconnected flexible device is then passed over the peripheral edge of the casing and hooked in place to the plate. The extensibility of spring connecting devices is ample to allow for all differences in the various commercial sizes of headlights to which the attachment may be applied.

It will be understood, of course, that in applying the device, this connecting spring may be detached with respect to the anchor ring rather than the plate, and hooked at said ring in completing the attachment. Obviously some or all of the spring hooks that need not be disengaged for application of the display attachment may be permanently locked with respect to the plate or the anchor ring. Thus the device is applicable to the headlight without the need for tools or the exercise of skill and without the need for disconnecting the headlight or even removing the lens or the lead in wires. The yielding or resilient connections between the plates at the front and the anchor device at the rear of the light, maintains the device securely positioned against vibration, rattling and this without involving the soldering, riveting or clamping of any other attachment or mounting appliances to the light casing. Removal of the device is effected with substantially the same facility as attachment thereof, and leaves the headlight intact.

In Figure 4 I have illustrated a modification of the anchoring device in which the ends of the spiral spring connecting devices are secured together by a series of shorter similar spring anchoring members 27. The ends of the spring connecting devices and spring anchoring members might be directly hooked or coupled together but I prefer to employ substantially triangular coupling links 28 each formed of a single length of wire bent to provide U shaped looped arms 29 diverging from a common center. Each of these links may have one of its respective arms secured to the rear end of one of the flexible connecting devices and its other two arms to the ends of two of the resilient anchoring springs. Each anchor spring connects the ends of two adjacent connecting devices so that the anchoring springs assume an approximately triangular conformation upon the rear of the headlight casing. A further alternative form of construction is suggested in Figure 8 wherein I employ coupling links 30 stamped from thin sheet metal and each including an apertured tongue 32 into which the end of the connecting device is hooked, and hook shaped arms 33 receiving the ends of the anchoring springs.

Where the spring anchoring means are utilized they assist somewhat in the self-adjustment of the attachment since tension on the connecting devices will serve to extend the spring anchoring means and enlarge the triangular formation shown in Figure 4. In Figure 5 is shown an alternative embodiment employing ribbon or tapes instead of spring connectors. Each ribbon or tape 21 is permanently riveted or otherwise secured to an edge of the sheet at 22 and the free end thereof is tied to the anchoring ring as at 22'.

Although the invention has a preferred field of application in the relation shown, it is applicable to a spot light, tail-light, side light or cowl light of an automobile and has a wider field of application either as a temporary or permanent attachment in combination with light sources other than those on an automobile or other vehicle. The matter displayed upon the sheet is entirely optional with the user and determined by the purpose for which the device is used. For instance, certain of the broader features of the invention are applicable to ordinary street lights for instance, for displaying the name of a street or similar information.

It will be understood although I prefer the construction shown and described, that types of connecting devices resilient, flexible or otherwise, other than those shown, might be employed and that the exact nature of the anchoring means might be considerably varied without affecting the successful operation or the expedient attachment of the display device.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting case.

Having thus described my invention, what I claim as new and desire to secure by Letters-Patent is:

1. The combination with a light source and a housing therefore having a transparent portion, of a sheet of flexible indicia bearing material disposed over the transparent portion of the housing and adapted to be illuminated by the light source within the housing, flexible connecting devices secured to the edges of the sheet passing over the edges of the housing means adjacent the face of the housing opposite the transparent portion for anchoring said devices, said flexible devices being elastic whereby they are self-adjusting to automatically vary their length and hold the sheet firmly in place.

2. The combination with a light source and a housing therefore having a transparent portion, of a sheet of flexible indicia bearing material disposed over the transparent portion of the housing and adapted to be illuminated by the light source within the housing and flexible resilient connecting devices secured to the sheet passing over the edges of the housing means adjacent the face of the housing opposite the transparent portion for anchoring said device.

3. The combination with a light source and a housing therefore having a transparent portion, of a sheet of flexible indicia bearing material disposed over the transparent portion of the housing and adapted to be illuminated by the light source within the housing, flexible devices extensible end-wise under tension, secured to the sheet, passing over the edges of the housing and means adjacent the face of the housing opposite the transparent portions for anchoring said devices.

4. The combination with an automobile headlight casing including a transparent portion through which light is adapted to be projected, of a sheet of light-pervious material adjacent and substantially parallel to said transparent portion and bearing indicia adapted to be thrown into relief by such light, flexible devices secured to the edges of the sheet passing over the peripheral edges of the headlight housing and anchored at the face of the housing opposite the transparent portion.

5. The combination with an automobile headlight casing including a transparent portion through which light is adapted to be projected, of a sheet of non-opaque material adjacent and substantially parallel to said transparent portion and bearing indicia adapted to be accentuated by such light, said disk of substantially the area of the transparent portion, flexible devices secured to the edges of the sheet passing over the peripheral edges of the headlight housing and means adjacent the face of the housing opposite the transparent portions for anchoring said devices, said devices being elastically self-adjusting as to effective length whereby the sheet may be firmly held in place.

6. The combination with an automobile headlight casing including a transparent portion through which light is adapted to be projected of a sheet of light pervious material adjacent and substantially parallel to said transparent portion and bearing indicia adapted to be accentuated by such light, self-adjusting resilient flexible connecting devices secured to the sheet passing over the peripheral edges of the casing and means for anchoring the free ends of the connecting devices.

7. An attachment of the class described comprising a sheet of flexible transparent material, flexible devices secured at intervals to the edges of the sheet, a plurality of extensible anchoring springs connected to each other and to the flexible devices, and substantially triangular connecting links coupling the ends of the flexible devices and the ends of the springs.

8. The combination with an automobile headlight casing including a transparent portion through which light is adapted to be projected, of a disk of light transmitting material adjacent and substantially parallel to said transparent portion and bearing indicia adapted to be accentuated by such light, flexible devices secured to the edges of the sheet and passing over the peripheral edges of the headlight housing, said devices being adjustable as to effective length whereby the sheet may be firmly held in place and anchoring device detachably engaged with the other ends of the flexible devices and held by the flexible devices against the side of the casing opposite the sheet.

9. An attachment of the class described comprising a sheet of flexible light pervious material adapted for disposition on the lens-face of a headlight, an anchoring device adapted for disposition on the rear face of the headlight and self-adjusting flexible connecting devices joining the sheet and the anchoring device and adapted to be tensioned to hold the sheet and the anchoring device firmly in applied position and to prevent slipping or rattling thereof upon vibration of the headlight.

10. A device of the class described including a sheet of flexible light pervious material adapted to be disposed over a headlight lens, an anchoring device adapted for disposition on the rear of a headlight casing, self-adjusting connecting devices passing around the peripheral edge of a headlight casing to connect the sheet and anchoring device, said anchoring device being yielding to partially remove tension of the connecting devices.

11. A device of the character described including a flexible light pervious sheet of material, flexible devices connected to the edges of the sheet, links connected to the ends of the flexible devices and anchoring springs having their ends connected to adjacent links.

12. A device of the character described including a flexible light pervious sheet of material, flexible devices connected to the edges of the sheet, links connected to the ends of the flexible devices and anchoring springs having their ends connected to adjacent links, said links being formed with three triangularly arranged portions, two of which are engageable with the ends of adjacent springs and one of which is engageable with the end of a flexible device.

13. A device of the character described including a flexible light pervious sheet of material, flexible devices connected to the edges of the sheet, links connected to the ends of the flexible devices and anchoring springs having their ends connected to adjacent lengths, said links comprising lengths of wire bent to provide a plurality of radiating looped arms engageable respectively with the engaging devices and the springs.

14. A device of the character described including a flexible light pervious sheet of material, flexible devices connected to the edges of the sheet, links connected to the ends of the flexible devices and anchoring springs having their ends connected to adjacent links, said links comprising three radiating looped portions for engagement with the springs and the connecting devices.

15. A device of the character described including a flexible light pervious sheet of material, flexible devices connected to the edges of the sheet, links connected to the ends of the flexible devices and anchoring springs having their ends connected to adjacent links, said links comprising thin metallic stampings including an apertured tongue for engagement with the end of an engaging device and a plurality of hooked arms for engagement with the springs.

16. As a new article of manufacture, a coupling link for connecting the ends of at least three adjacent attachment members, a length of wire bent to provide a series of radially disposed U shaped loops, the legs of adjacent loops converging toward a common center.

17. The combination with an automobile headlight casing of a disk of light-pervious material disposed over the lens thereof and substantially parallel thereto and bearing indicia adapted to be thrown into relief by the light, hooks secured near the periphery of the plate and connecting means connected at one end to an anchoring means adjacent the rear of the headlight and at the other end to the hooks.

Signed at New York, in the county of New York and State of New York this 30th day of June, A. D. 1924.

SAMUEL SIEGEL.